(12) United States Patent
Christiana et al.

(10) Patent No.: US 6,811,023 B1
(45) Date of Patent: Nov. 2, 2004

(54) MODULAR TROUGH CONVEYOR BELT AND MODULES

(75) Inventors: Sandra A. Christiana, Harahan, LA (US); Andrew A. Corley, Harahan, LA (US); Robert S. Lapeyre, New Orleans, LA (US)

(73) Assignee: Laitram, L.L.C., Harahan, LA (US)

(*) Notice: Subject to any disclaimer, the term of this patent is extended or adjusted under 35 U.S.C. 154(b) by 0 days.

(21) Appl. No.: 10/249,956

(22) Filed: May 22, 2003

(51) Int. Cl.⁷ .............................................. B65G 25/00
(52) U.S. Cl. ...................... 198/822; 198/818; 198/850; 198/851; 198/853
(58) Field of Search ................................ 198/822, 818, 198/819, 836.4, 840, 850, 851, 852, 853, 957

(56) References Cited

U.S. PATENT DOCUMENTS

| | | | | |
|---|---|---|---|---|
| 700,308 A | * | 5/1902 | Dodge | 198/846 |
| 705,876 A | * | 7/1902 | Selleck | 198/846 |
| 1,405,233 A | * | 1/1922 | Jules | 198/817 |
| 2,505,354 A | * | 4/1950 | Carroll et al. | 198/847 |
| 3,557,938 A | * | 1/1971 | Christensen | 198/851 |
| 4,280,620 A | | 7/1981 | Baker, Jr. et al. | 198/825 |
| 4,461,378 A | * | 7/1984 | Roth | 198/370.04 |
| 4,515,265 A | * | 5/1985 | Hill | 198/821 |
| 4,650,068 A | | 3/1987 | Vanassche et al. | 198/847 |
| 4,709,806 A | | 12/1987 | Candle | 198/819 |
| 4,925,016 A | | 5/1990 | Lapeyre | 198/834 |
| 5,107,983 A | | 4/1992 | Tschantz | 198/819 |
| 5,346,057 A | * | 9/1994 | Fisher et al. | 198/778 |
| 5,507,383 A | | 4/1996 | Lapeyre et al. | 198/853 |
| 5,671,839 A | * | 9/1997 | Sanderson | 198/848 |
| 5,850,902 A | * | 12/1998 | Hicks et al. | 198/457.05 |
| 5,947,262 A | * | 9/1999 | Boring et al. | 198/803.1 |
| 6,079,543 A | * | 6/2000 | Palmaer | 198/445 |
| 6,230,955 B1 | * | 5/2001 | Parks | 226/190 |
| 6,491,156 B1 | * | 12/2002 | Hudson | 198/811 |
| 6,540,069 B2 | | 4/2003 | Tschantz | 198/844.1 |
| 6,644,466 B2 | * | 11/2003 | Knott et al. | 198/850 |
| 6,705,460 B2 | * | 3/2004 | Weiser et al. | 198/850 |
| 6,708,818 B2 | * | 3/2004 | Kato et al. | 198/853 |

* cited by examiner

*Primary Examiner*—Douglas Hess
(74) *Attorney, Agent, or Firm*—James T. Cronvich (57) ABSTRACT

A modular conveyor belt constructed of a series of rows of belt modules with a hinge formed in each row and aligned in the direction of belt travel with hinges of adjacent rows. The hinge allows the belt to conform to a non-coplanar carryway support to form, for example, a trough. In some versions, the hinge is a living hinge formed by flexible or thinned-out regions of the belt between rigid regions. In other versions, the hinge is formed by interleaved hinge eyes between modules along each row interconnected by a hinge pin along an axis oriented in the direction of belt travel.

35 Claims, 7 Drawing Sheets

MODULAR TROUGH CONVEYOR BELT AND MODULES

BACKGROUND OF INVENTION

The invention relates to power-driven conveyors generally and, more specifically, to modular conveyor belts having a hinge formed in each row of belt modules, in which the hinge has an axis generally oriented in the direction of belt travel.

Modular conveyor belts, especially modular plastic conveyor belts, are widely used to transport articles. These belts are typically constructed of a series of rows of one or more plastic modules arranged in a bricklay pattern. Link ends along leading and trailing ends of the modules interleave with each other. Aligned apertures in the interleaved link ends form a passageway for receiving a hinge rod that connects adjacent rows pivotably together at a hinge joint. The individual modules are typically molded out of a thermoplastic material, such as polypropylene, polyethylene, or acetal, or a thermoset. Modules made of these materials are characterized by a rigidity that limits the stretching and bending the modules undergo in the presence of belt pull and product loading. Consequently, a belt made of these rigid modules remains flat along the carryway. In conveying aggregate materials, for example, these belts use sideguards to confine the loose material to the flat conveying surface of the belt. But sideguards are usually fairly thin and susceptible to damage.

Flat conveyor belts of the rubber and fabric kind are widely used to convey aggregate materials. These flat belts, which are inherently flexible, can be made to bend and conform to a supporting carryway that is not flat. For example, the carryway support can be shaped to conform the flat belt to a U-shape, like a trough. Such a trough belt is useful in conveying aggregate materials because the edges of the belt, being higher than the center, help confine the aggregate. But modular plastic belts offer many advantages over flat belts. Some of these advantages include easy repair and positive driving and tracking.

Thus, there is a need for a modular plastic conveyor belt that can conform to a non-planar conveyor carryway.

SUMMARY OF INVENTION

That and other needs are satisfied by a modular conveyor belt embodying features of the invention. The belt is constructed of a series of rows of belt modules interlinked by connecting pins between consecutive belt rows arranged end to end to form an endless conveyor belt. Each belt row includes at least one module, which has a body portion that extends from a first end to a second end in the direction of belt travel and transversely from a first side to a second side. A first plurality of connecting elements is arranged along the first end, and a second plurality is arranged along the second end. The first plurality of connecting elements of a row interleaves with the second plurality of connecting elements of an adjacent row. A connecting pin pivotally joins the interleaved connecting elements in a joint between consecutive rows. Each row also includes a hinge extending from the first end to the second end and aligned with hinges of adjacent rows in the direction of belt travel.

According to another aspect of the invention, a modular conveyor belt is constructed of a plurality of belt modules arranged end to end and side to side and interconnected by connecting pins into articulating rows of belt modules. The belt comprises a base portion with a first longitudinal lane of belt modules extending transversely from a first base side to a second base side. The base portion includes a series of hinge eyes along the first base side. The belt also comprises a right edge portion with a second longitudinal lane of belt modules extending transversely from a first right edge side to a second right edge side. The right edge portion includes a series of hinge eyes along the second right edge side. A hinge pin extends through the interleaved hinge eyes of the base portion and the right edge portion. Together with the hinge eyes, the hinge pin forms a longitudinal hinge between the two portions.

According to yet another aspect of the invention, a modular conveyor belt is made up of a series of rows of belt modules. Each row has at least one module that includes a body portion extending longitudinally from a first end to a second end and transversely from a first side to a second side. A first plurality of connecting elements is arranged along the first end; a second plurality of connecting elements, along the second end. Connecting pins pivotally link consecutive belt rows end to end through the interleaved first and second pluralities of connecting elements to form an endless belt. The body portion includes a flexible region extending from the first end to the second end to form a hinge permitting the body portion to flex about a generally longitudinal axis.

According to still another aspect of the invention, a modular conveyor belt comprises a series of rows of belt modules hingedly linked by connecting pins confined between rows. Each row includes a module that extends longitudinally from a first end to a second end and transversely from a first side to a second side. The module includes a plurality of first regions made of a flexible material and a plurality of second regions made of a rigid material. The two regions are integrally formed with and alternately arranged with each other transversely across the module.

In another aspect of the invention, a conveyor belt module comprises a body portion that extends longitudinally from a first end to a second end and transversely from a first side to a second side.

First and second pluralities of connecting elements are spaced apart along the first and second ends. A flexible region extending from the first end to the second end forms a hinge permitting the body portion to flex about a generally longitudinal axis.

In yet another aspect of the invention, a conveyor belt module comprises a body portion that extends longitudinally from a first end to a second end and transversely from a first side to a second side. First and second pluralities of connecting elements are arranged along the first and second ends, respectively. A plurality of hinge eyes extends along the first side and forms a longitudinally aligned set of hinge eyes.

BRIEF DESCRIPTION OF DRAWINGS

These and other aspects and features, as well as advantages, of the invention are described in more detail in the following description, appended claims, and accompanying drawings, in which:

DETAILED DESCRIPTION

One version of a belt module embodying features of the invention is shown in FIGS. 1A-1D. The module 10 includes a body portion 12 extending from a first end 14 to an opposite second end 15 in a longitudinal direction L and transversely from a first side 16 to a second side 17. Connecting elements are spaced apart along the first and second ends. Aligned openings 20 through the connecting elements at each end of the module receive a connecting pin. The module of FIG. 1 includes a transverse drive or support bar 22 extending downward from a bottom 24 of the module body. The bar can receive a driving force from a drive sprocket or serve to resist impacts to the top conveying surface 26.

Figure 1A:
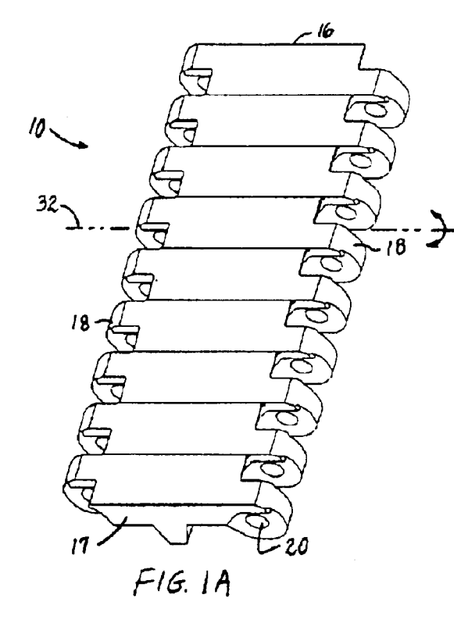
FIGS. 1A-1D are isometric, side elevation, front elevation, and top plan views of one version of belt module usable in a modular conveyor belt embodying features of the invention.
Figure 1B:
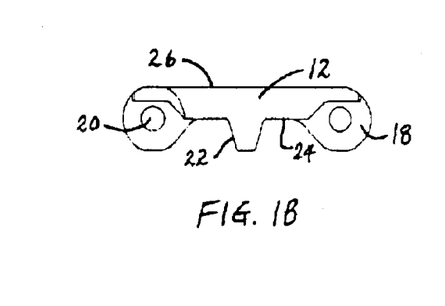
Figure 1C:
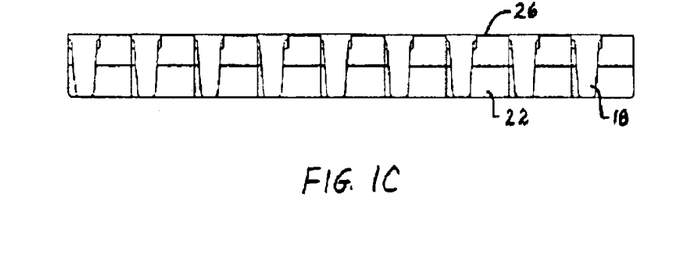
Figure 1D:
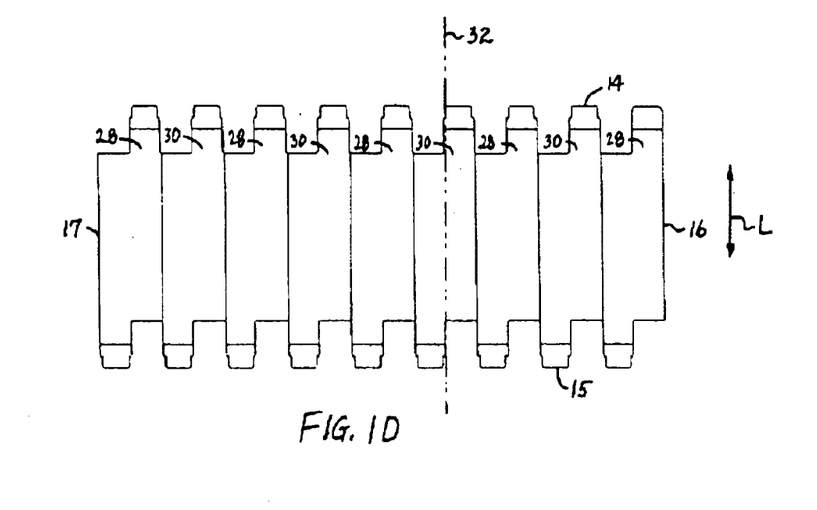

As best shown in FIG. 1D, the module body includes alternating rigid regions 28 and flexible regions 30. The regions are arranged side by side as links across the width of the module. Each region, or link, includes a connecting element at each end. Each flexible region can serve as a hinge with a hinge axis 32 in the longitudinal direction about which the module can fold. Although the module of FIG. 1 is shown with four flexible regions alternating with five rigid regions, it could alternatively comprise a single flexible region sandwiched between rigid regions extending to each side of the module, as just one example.

The module is preferably made by a two-material injection molding process in which the rigid material is made of a thermoplastic material, such as polypropylene, polyethylene, acetal, and polyester; and the flexible material is made of a rubber-like material, such as TPE (thermoplastic elastomer); e.g., TPU (thermoplastic urethane) and SEBS (styrene-ethylene-butylene-styrene). For the purposes of this description, the term flexible qualifies a rubber-like piece as having a modulus of elasticity great enough to allow the piece to act as a hinge without undergoing permanent plastic deformation in a belt for a trough conveyor. The term rigid qualifies a plastic piece as having a modulus of elasticity less than that of an adjacent flexible piece in a belt module according to the invention. The materials are injected into a mold cavity where they are molded together under pressure to form a secure bond. Of course, the modules could be formed in different processes. For example, the rigid regions could be molded first and the molded rigid pieces placed in position in a mold cavity. Then the flexible material, which could alternatively be a thermoset, could be injected into the cavity between the rigid regions and allowed to cure and bond to the rigid region pieces. These are just two examples of ways to manufacture the modules of FIG. 1.

Another version of module is shown in FIGS. 2A-2D. The module 110 includes a body portion 112 extending from a first end 114 to a second end 115 in the longitudinal direction L and transversely from a first side 116 to a second side 117. Connecting elements 118 are spaced apart along the first and second ends. Aligned openings 120 through the connecting elements at each end of the module receive a connecting pin.

The module body is formed of a series of flexible regions 130, 131 alternating side by side with a series of rigid regions 128, 129. The rigid regions shown in FIG. 2 include internal rigid regions 128 and side edge regions 129. The internal rigid regions are Y-shaped with one connecting element at one end and two at the other. Consecutive rigid regions are oppositely arranged. The flexible regions, which are preferably devoid of connecting elements, are disposed between and bonded to consecutive rigid regions.

Figure 2A:
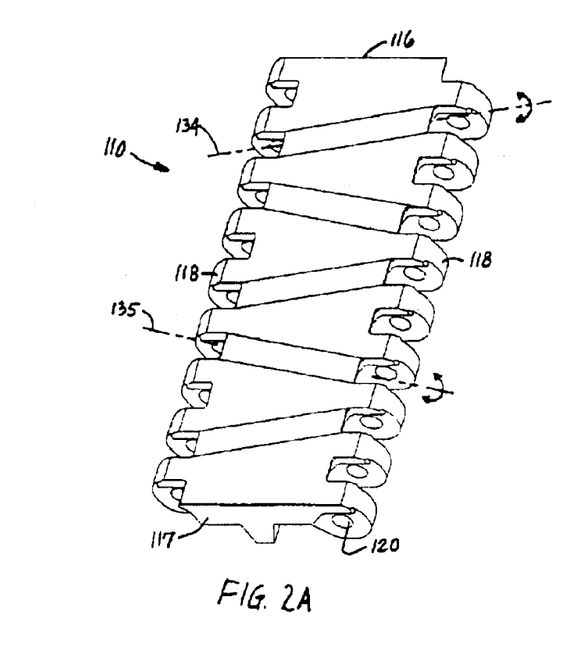
FIGS. 2A-2D are isometric, side elevation, front elevation, and top plan views of another version of belt module usable in a modular conveyor belt embodying features of the invention.
Figure 2B:
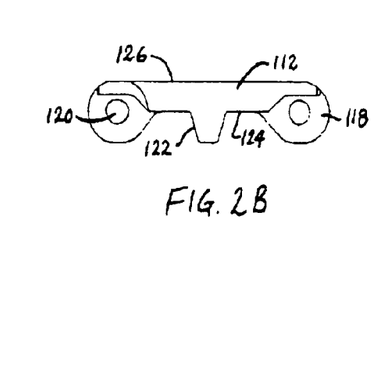
Figures 2C, 2D:
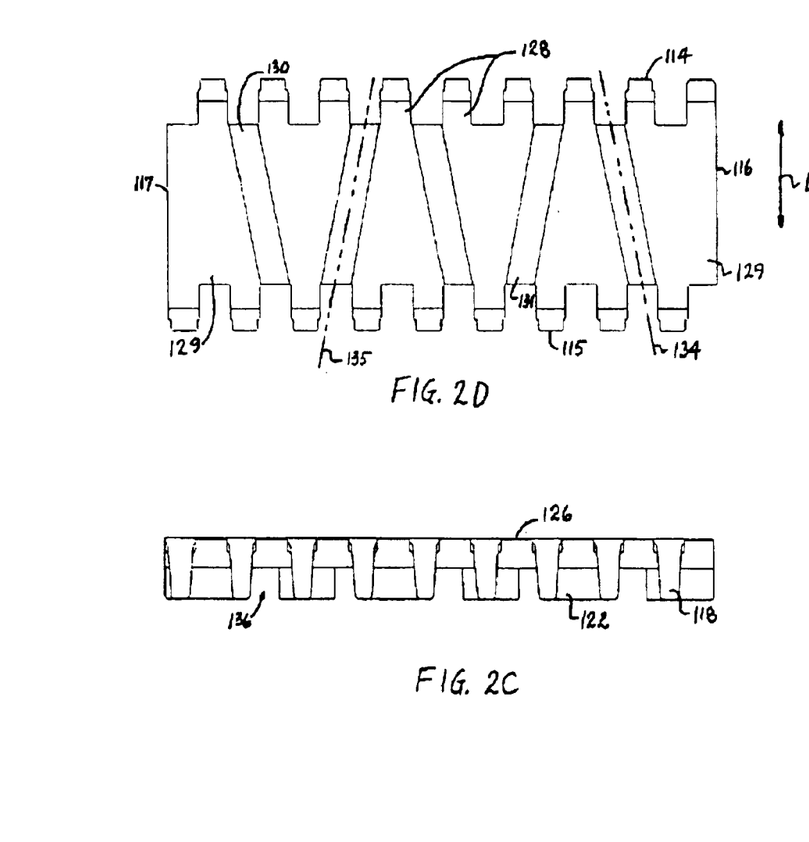

Because of the shape of the rigid regions, consecutive flexible regions 130, 131 form strips extending from the first end to the second end of the module along axes 134, 135 that are oblique to the longitudinal direction and to the transverse direction. Despite the slightly oblique orientation, the flexible strips still permit the module to flex about a generally longitudinal axis. In this way, the flexible strips form hinges that allow the module to bend about a generally longitudinal axis and to twist.

Unlike in the module of FIG. 1, all the connecting elements of FIG. 2 are made of a rigid material for more strength. For added flexibility, a transverse bar 122, which extends from a module bottom 124 opposite a top conveying surface 126, is segmented rather than continuous. Gaps 136 are formed at the flexible regions. The resulting thinned-out flexible regions increase the bendability of the module.

FIGS. 3A-3D illustrate another version of belt module 210, which includes a body portion 212 extending from a first end 214 to a second end 215 in the longitudinal direction L and transversely from a first side 216 to a second side 217. Connecting elements 218 are spaced apart along the first and second ends. Aligned openings 220 through the connecting elements at each end of the module receive a connecting pin.

Figure 3A:
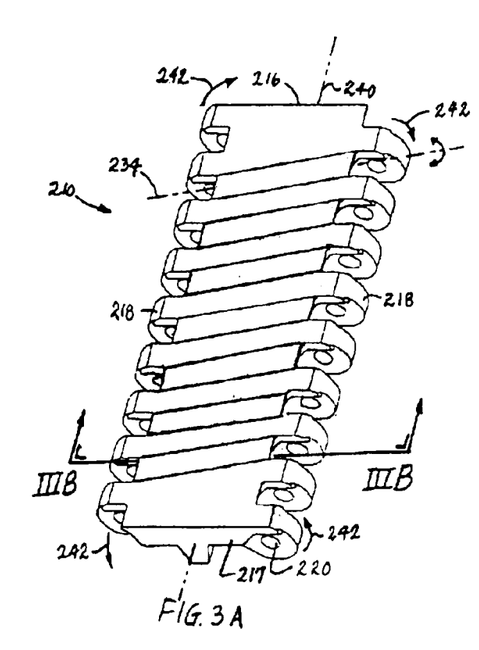
FIGS. 3A-3D are isometric, side cross section along line IIIB-IIIB of FIG. 3A, front elevation, and top plan views of another version of belt module having a transverse spine and usable in a modular conveyor belt embodying features of the invention.

The module body is formed of a series of flexible regions 230, 231 alternating side by side with a series of rigid regions 227, 228, 229.

The rigid regions shown in FIG. 2 include internal rigid regions 128 and side edge rigid regions 129. The internal rigid regions include internal rigid regions 228 and left-and right-side regions 227, 229. The side edge regions are Y-shaped with one connecting element at one end and two at the other. The internal rigid regions and the flexible regions are generally parallel to each other and to an oblique axis 234. The flexible regions are preferably devoid of connecting elements. Despite the slightly oblique orientation, the flexible strips still permit the module to flex about a generally longitudinal axis.

Figure 3B:
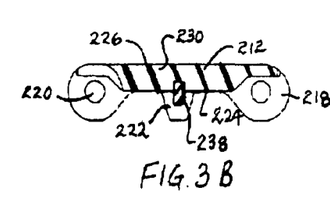
Figure 3C:
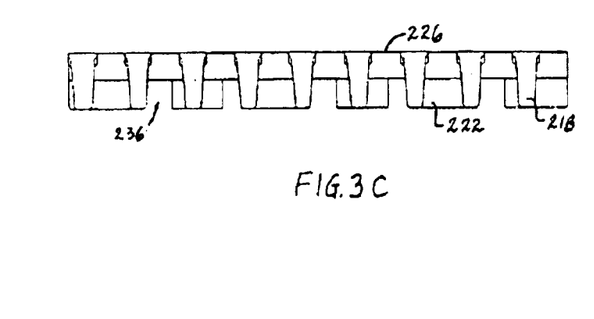
Figure 3D:
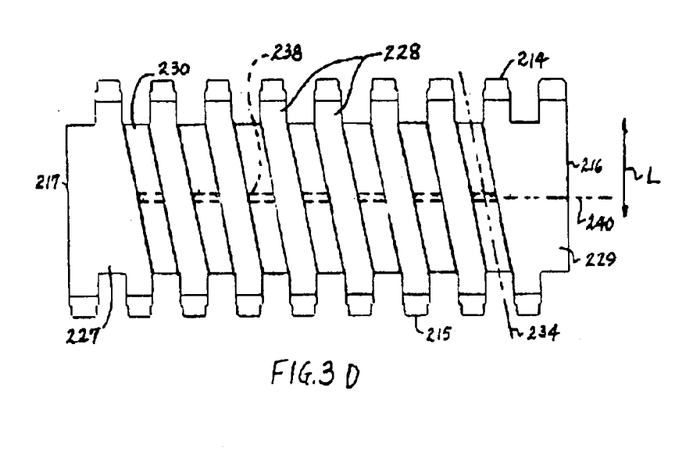

As indicated in FIGS. 3B and 3D, the module body includes a transverse spine 238, preferably molded out of the same material as the rigid regions. Alternatively, the spine is realized as a cord or flexible metal cable. The spine links consecutive rigid regions and extends through the intervening flexible region in which it is embedded at about the level of the aligned openings 220. The thin transverse spine adds some beam strength to the module and allows the module to twist, as indicated by arrows 242 in FIG. 3A, about its transverse axis 240, which preferably coincides with the transverse centerline of the module. The twistability helps a belt constructed of these modules transition between planar and non-planar carryway configurations. Clearly the spine could be included in the structures of modules such as those in FIGS. 1 and 2 or in versions in which the connecting elements along the first end of the module are not transversely offset from those along the second end. For added flexibility, a transverse bar 222, which extends from a module bottom 224 opposite a top conveying surface 226, is segmented with gaps 236 formed at the flexible regions.

Figure 4:
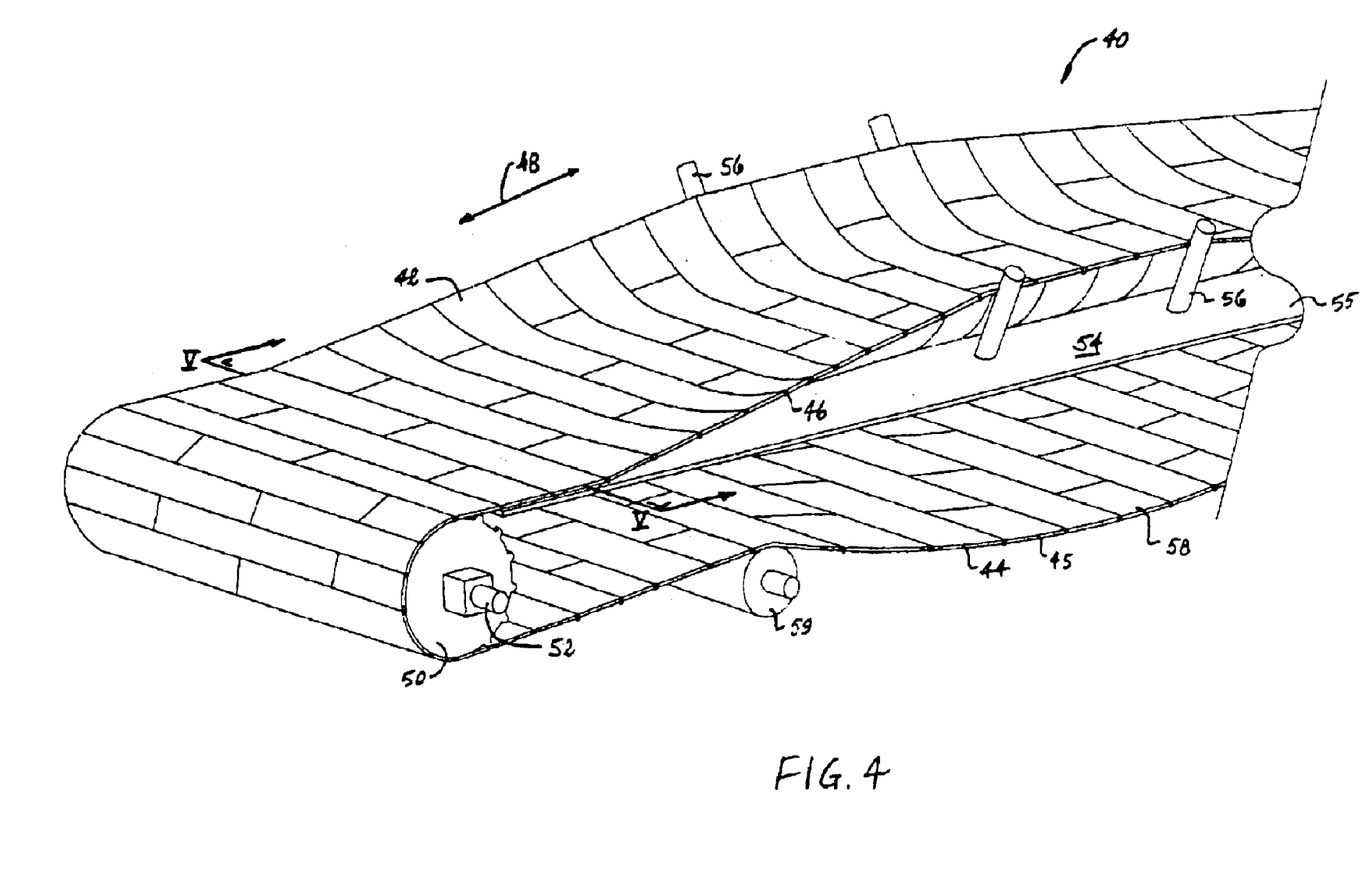
FIG. 4 is an isometric view of a portion of a trough belt made of modules, such as those in FIGS. 1-3, embodying features of the invention.
Figure 5:
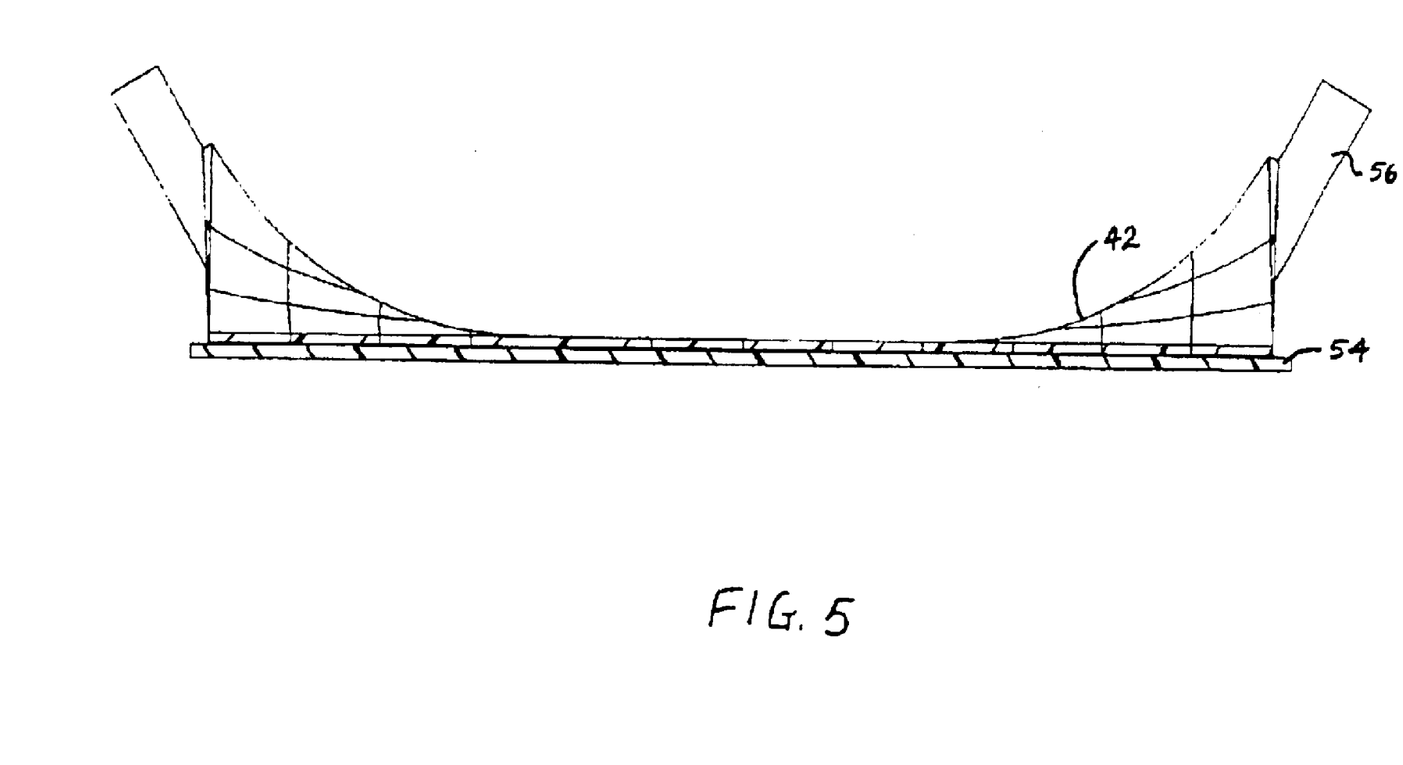
FIG. 5 is a cross section of the trough belt of FIG. 4 taken along line V—V.

FIGS. 4 and 5 show a portion of a conveyor 40 that includes a modular plastic conveyor belt 42 made of modules as in FIGS. 1-3. The belt is constructed of a series of rows 44, 45 of belt modules interlinked end to end by bendable connecting pins 46 received in the aligned openings of interleaved connecting elements of consecutive rows. The belt modules are preferably arranged in a bricklay pattern with the hinges from row to row preferably aligned longitudinally in the direction of belt travel 48. The belt is driven by a set of motor-driven drive sprockets 50 mounted on a drive shaft 52 support for rotation in a conveyor frame (not shown). A carryway 54 with a bottom bed 55 supports the belt along the conveying portion of the path. The belt returns along bottom returnway 58. A roller 59 reduces sag in the returnway. An idler sprocket (not shown) at the opposite end of the conveyer from the drive sprocket set returns the belt to the carryway. Posts 56 upstanding from opposite sides of the bed at positions closer together than the width of the belt form a width-restricted channel that causes the belt to form a trough. The flexible hinge regions allow the belt to bend along the hinge axes and conform to the non-coplanar shape of the carryway. The raised sides of the trough belt along the carryway make it useful in confining aggregates, grains, vegetables, and other loose materials. Of course, non-coplanar carryways can be formed in other ways. For example, the carryway bed could be formed out of a curved sheet to which the trough belt conforms as it rides along.

Figure 6:
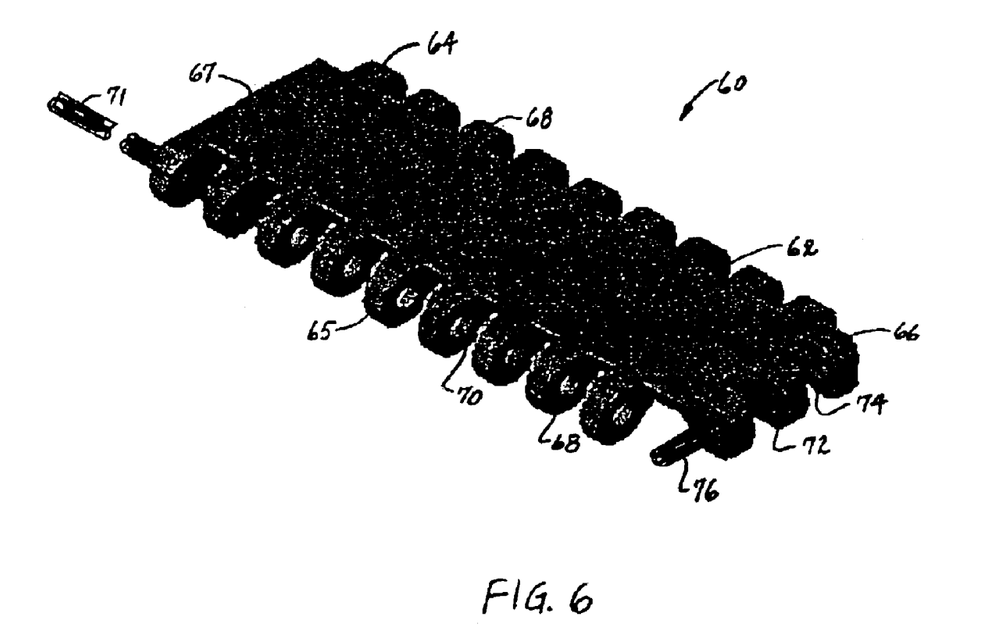
FIG. 6 is an isometric view of another view of belt module usable in a conveyor belt as in FIG. 4.

A belt module useful in constructing a trough belt with a hinge rod rather than a living hinge is shown in FIG. 6. The module 60 is molded essentially entirely out of a rigid material. A body portion 62 extends longitudinally from a first end 64 to a second end 65 and transversely from a first 66 to a second side 67. Connecting elements 68 with aligned openings 70 are spaced apart transversely along the first and second ends of the body portion. The openings receive a connecting pin 71. Hinge eyes 72, which may be similar to the connecting elements, are spaced apart longitudinally along the first side. Apertures 74 formed in the hinge eyes receive a hinge pin 76.

Figure 7A:
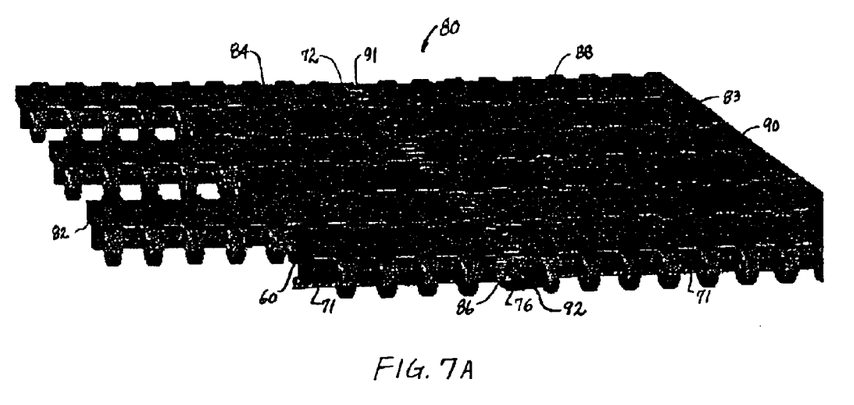
FIGS. 7A and 7B are isometric views of a side portion of a conveyor belt constructed of modules as in FIG. 6 on respective flat and trough portions of a conveying path.
Figure 7B:
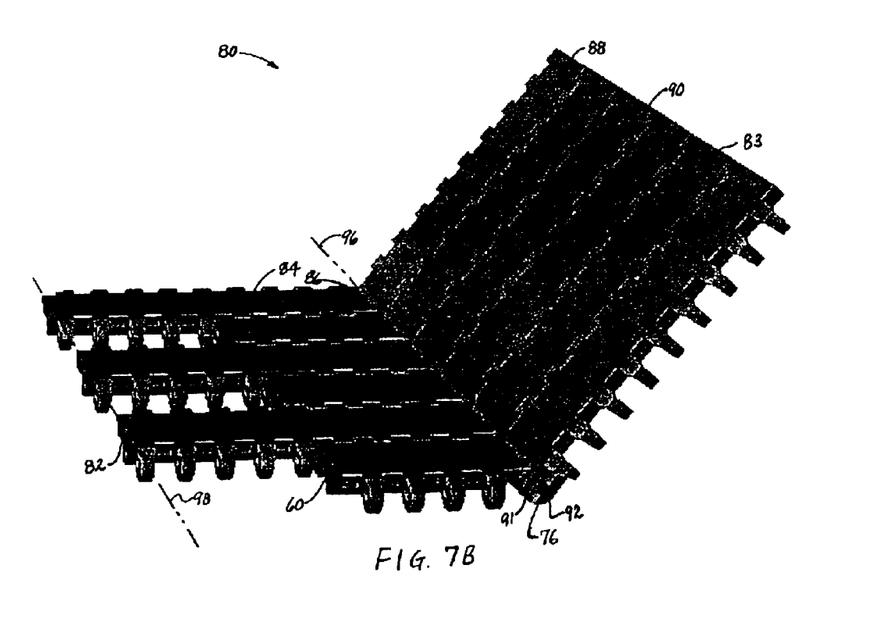

A portion of a conveyor belt constructed of such modules is shown in FIGS. 7A and 7B. The belt portion 80 shown is a right-side portion of a conveyor belt. The belt shown is made up of modules 60 as in FIG. 6, longer such modules 82, and edge modules 83. The modules 60 and the modules 82 are preferably bricklaid to construct a first longitudinal lane of modules forming a base portion 84 of the conveyor belt with a series of hinge eyes along a first base side 86 of the belt. An opposite second base side of the row may or may not include hinge eyes. The base portion can further comprise interior modules (not shown) that differ from the other base modules in that they do not include hinge eyes along either side. These interior modules can be bricklaid with the other base modules to form a conveyor belt of any desired width. A second longitudinal lane of edge belt modules 83 forms a right edge portion 88 extending from a first right edge side 90 to a second right edge side 91. Hinge eyes 92 are formed along the second right edge side of the longitudinal lane of modules. The modules making up the right edge portion are interconnected end to end by a connecting pin 71, which is preferably segmented with a separation at the hinge eyes. The hinge eyes 72 along the first base side of the base module rows interleave with the hinge eyes 92 of the right edge portion and are interconnected by a hinge pin 76 journaled in the aligned apertures. In this way, a hinge joint is formed that allows the belt to bend along a longitudinal axis 96, as shown in FIG. 7B. The left edge side of the belt could be formed in the same way as the right edge side so that, when the belt encounters a non-coplanar carryway support, the edges can bend upward to form a trough. In such a case, the hinges are preferably symmetrically formed about the centerline 98 of the belt. Of course, if a raised edge is required on only one side, the other edge of the belt need not include a hinge and could terminate in base modules without hinge eyes along that edge.

Thus, the invention has been described in detail with respect to a few preferred versions, but other versions and variations are possible. As just one example, the body portion of the modules need not include a transverse drive bar. Other belt structures, such as belts driven at the connecting element, could be used in trough conveyors according to the invention. As another example, the thinned-out region forming a living hinge can be made of a flexible material or even a rigid material, if thinned sufficiently. Furthermore, the belt can be used for other applications that require a non-planar belt configuration, such as to break up ice or other crusty buildup or to narrow the belt through a width-restricted opening. Thus, the invention is not restricted to the particular embodiments described and illustrated, but includes all embodiments and modifications that may fall within the scope of the appended claims.

What is claimed is:

1. A modular conveyor belt comprising a series of rows of belt modules and connecting pins interlinking consecutive belt rows end to end to form an endless conveyor belt, each row including at least one module comprising a body portion extending from a first end to a second end in the direction of belt travel and transversely from a first side to a second side, a first plurality of connecting elements along the first end, and a second plurality of connecting elements along the second end, the first plurality of connecting elements of a row being interleaved with the second plurality of connecting elements of an adjacent row and pivotally joined by a segmented or bendable connecting pin in a joint between consecutive rows of belt modules, wherein each row includes a hinge extending from the first end to the second end and aligned with the hinges of adjacent rows in the direction of belt travel.

2. A modular conveyor belt as in claim 1 wherein the hinge is a living hinge.

3. A modular conveyor belt as in claim 1 wherein the hinge is formed along a thinned-out region of the body portion of a belt module.

4. A modular conveyor belt as in claim 1 wherein each row includes a base edge module, a side module, and a hinge rod, the base edge module including one or more hinge eyes along the first side, the side module including one or more hinge eyes along the second side that interleave with the hinge eyes along the first side of the base edge module, wherein the hinge rod joins the interleaved hinge eyes to form the hinge.

5. A modular conveyor belt as in claim 1 comprising a plurality of hinges having hinge axes generally in the direction of belt travel.

6. A modular conveyor belt as in claim 5 comprising a pair of hinges spaced transversely apart equidistant from the centerline of the belt.

7. A modular conveyor belt as in claim 1 wherein the body portion includes a strip made of a flexible material forming the hinge.

8. A modular conveyor belt as in claim 1 wherein the body portion comprises a flexible region integrally formed side by side with a rigid region, wherein the flexible region defines the hinge.

9. A modular conveyor belt as in claim 1 wherein the body portion comprises a series of first and second regions alternating transversely across the body portion, wherein the first regions are made of a rigid material and the second regions are made of a flexible material.

10. A modular conveyor belt as in claim 9 wherein the first regions include one or more connecting elements on each end and wherein the second regions are devoid of connecting elements.

11. A modular conveyor belt as in claim 9 wherein each of the second regions defines an axis oblique to the direction of belt travel.

12. A modular conveyor belt as in claim 9 wherein the body portion further includes a transverse spine disposed in the flexible regions and linking consecutive rigid regions along a centerline of the body portion.

13. A modular conveyor belt as in claim 1 wherein the body portion comprises a series of side-by-side links, each terminating in one of the connecting elements at each end, wherein at least one of the links is made of a flexible material and forms the hinge.

14. A modular conveyor belt as in claim 1 wherein the body portion comprises a series of side-by-side links, each terminating in one of the connecting elements at each end, wherein links made of a flexible material alternate transversely across the body portion with links made of a rigid material.

15. A modular conveyor belt as in claim 1 wherein the connecting pin is segmented at the hinge into separate segments.

16. A belt conveyor comprising:
   a modular conveyor belt as in claim 1; and
   a carryway supporting the modular conveyor belt, the carryway being characterized by a non-coplanar support portion that forces the modular conveyor belt to bend at the hinge to conform to the carryway.

17. A modular conveyor belt constructed of a plurality of belt modules arranged end to end and side to side and interconnected by segmented or bendable connecting pins through interleaved connecting elements at adjacent ends of consecutive belt modules into articulating rows of belt modules, the modular conveyor belt comprising:
   a base portion comprising a first longitudinal lane of first ones of the belt modules extending transversely from a first base side to a second base side;
      the base portion including a series of hinge eyes along the first base side;
   a right edge portion comprising a second longitudinal lane of second ones of the belt modules extending transversely from a first right edge side to a second right edge side;
      the right edge portion including a series of hinge eyes along the second right edge side;
   a hinge pin extending through the interleaved hinge eyes of the base portion and the right edge portion to form with the hinge eyes a longitudinal hinge between the base portion and the right edge portion of the belt.

18. A modular conveyor belt as in claim 17 further comprising:
   a left edge portion comprising a third longitudinal lane of third ones of the belt modules extending transversely from a first left edge side to a second left edge side;
      the left edge portion including a series of hinge eyes along the first left edge side;
   and wherein the base portion includes a series of hinge eyes along the second base side and a hinge rod extends through the interleaved hinge eyes of the base portion and the left edge portion to form with the hinge eyes a second longitudinal hinge between the base portion and the left edge portion of the belt.

19. A modular conveyor belt comprising:
   a series of rows of belt modules, each row including at least one module that includes:
      a body portion extending longitudinally from a first end to a second end in the direction of belt travel and transversely from a first side to a second side;
      a first plurality of connecting elements along the first end; and
      a second plurality of connecting elements along the second end;
   wherein the first plurality of connecting elements along the first end of a row are interleaved with the second plurality of connecting elements along the second end of a consecutive row;
   segmented or bendable connecting pins pivotably interlinking consecutive belt rows end to end through the interleaved first and second pluralities of connecting elements to form an endless conveyor belt;
   wherein the body portion includes a flexible region extending from the first end to the second end and forming a hinge permitting the body portion to flex about a generally longitudinal axis.

20. A modular conveyor belt as in claim 19 wherein the body portion includes a plurality of flexible regions spaced apart transversely across the module.

21. A modular conveyor belt as in claim 19 wherein the flexible region includes a connecting element at each end.

22. A modular conveyor belt as in claim 19 wherein the flexible region defines an axis oblique to the longitudinal and transverse directions.

23. A modular conveyor belt as in claim 19 wherein the body portion includes a series of flexible regions alternating transversely with a series of rigid regions.

24. A modular conveyor belt as in claim 23 wherein the body portion further includes a transverse spine disposed in the flexible regions and linking consecutive rigid regions along a centerline of the body portion.

25. A modular conveyor belt comprising:
   a series of rows of belt modules hingedly linked by segmented or bendable connecting pins confined between rows, each row including a module extending longitudinally from a first end to a second end and transversely from a first side to a second side, the module including:
      a plurality of first regions made of a flexible material;
      a plurality of second regions made of a rigid material and integrally formed with and alternately arranged with the first regions transversely across the module.

26. A modular conveyor belt as in claim 25 wherein the second regions include a first connecting element at the first end and a second connecting element at the second end.

27. A modular conveyor belt as in claim 25 wherein the second regions include:
   a first connecting element at the first end;
   a pair of spaced apart second connecting elements at the second end; and a pair of links, each connecting the first connecting element to a respective one of the second connecting elements.

28. A modular conveyor belt as in claim 25 wherein the first regions are aligned along an axis oblique to the longitudinal and transverse directions.

29. A belt conveyor comprising:

a modular conveyor belt as in claim 25; and a carryway supporting the modular conveyor belt, the carryway being characterized by a non-coplanar support portion that forces the modular conveyor belt to bend at the second regions to conform to the carryway.

30. A conveyor belt module comprising:

a body portion extending longitudinally from a first end to a second end and transversely from a first side to a second side;

a first plurality of spaced apart connecting elements along the first end;

a second plurality of spaced apart connecting elements along the second end, and a flexible region extending from the first end to the second end and forming a hinge permitting the body portion to flex about a generally longitudinal axis.

31. A conveyor belt module as in claim 30 wherein the body portion includes a plurality of flexible regions spaced apart transversely across the module.

32. A conveyor belt module as in claim 30 wherein the flexible region includes a connecting element at each end.

33. A conveyor belt module as in claim 30 wherein the flexible region defines an axis oblique to the longitudinal and transverse directions.

34. A conveyor belt module as in claim 30 wherein the body portion includes a series of flexible regions alternating transversely with a series of rigid regions.

35. A modular conveyor belt as in claim 34 wherein the body portion further includes a transverse spine disposed in the flexible regions and linking consecutive rigid regions along a centerline of the body portion.

* * * * *